United States Patent [19]
Hastings

[11] Patent Number: 6,079,149
[45] Date of Patent: Jun. 27, 2000

[54] METHOD AND APPARATUS FOR THE REMOVAL AND ELIMINATION OF FIRE ANTS

[76] Inventor: Glenn Hastings, 1506 W. First St., Mount Pleasant, Tex. 75455

[21] Appl. No.: 09/145,825

[22] Filed: Sep. 2, 1998

[51] Int. Cl.⁷ .............................. A01M 1/00; A01M 1/20
[52] U.S. Cl. ............................................. 43/124; 43/132.1
[58] Field of Search ......................... 43/124, 121, 132.1, 43/900; 111/7.1, 7.2, 7.3, 7.4

[56] References Cited

U.S. PATENT DOCUMENTS

| | | | |
|---|---|---|---|
| 1,148,910 | 8/1915 | Le Baron | 111/7.1 |
| 1,513,138 | 10/1924 | Tarnok | 111/7.1 |
| 3,968,937 | 7/1976 | Miller | 111/7.1 |
| 4,594,807 | 6/1986 | McQueen | 43/132.1 |
| 4,637,161 | 1/1987 | Turner | 43/130 |
| 4,756,118 | 7/1988 | Evans | 43/132.1 |
| 4,768,306 | 9/1988 | Hilbun | 43/125 |
| 4,815,234 | 3/1989 | Connolly | 43/132.1 |
| 5,054,231 | 10/1991 | Witherspoon | 43/124 |
| 5,109,629 | 5/1992 | King | 43/132.1 |
| 5,154,018 | 10/1992 | Livingston | 43/125 |
| 5,319,878 | 6/1994 | Moffett | 43/124 |
| 5,870,852 | 2/1999 | Stanley | 43/130 |

*Primary Examiner*—Kurt Rowan
*Attorney, Agent, or Firm*—Kent A. Herink; Daniel A. Rosenberg; Davis Brown, Law Firm

[57] ABSTRACT

A liquid bearing member is inserted into an ant mound thereby allowing the inundation of the ant mound with a liquid through a liquid bearing member. An evacuation chamber secures over the ant mound, thereby allowing the capture of the liquid within the evacuation chamber. Upon inundating the ant mound with the liquid, the liquid level rises in the evacuation chamber to a level elevated above the surface of the ant mound. The ants and ant larvae, in accordance with their survival instincts, rise to the top level of the liquid within the evacuation chamber thereby entering a collection device in operable communication with the evacuation chamber.

9 Claims, 6 Drawing Sheets

METHOD AND APPARATUS FOR THE REMOVAL AND ELIMINATION OF FIRE ANTS

BACKGROUND OF THE INVENTION

The present invention relates to a method and apparatus for the removal of ants and ant larvae from an ant mound. More specifically, the present invention relates to an apparatus and method for the removal of ants and ant larvae from an ant mound, whereby a liquid bearing member is inserted into an ant mound, an evacuation chamber is secured over the ant mound, the ant mound is inundated with a liquid, which raises the level of the liquid in an evacuation chamber secured to the ant mound, subsequently capturing the ants and ant larva in a collection device in operable communication with the evacuation chamber.

Those skilled in the art have, for a long time, appreciated the futility and frustration associated with the control and elimination of ant colonies. In particular, one of the most destructive, aggressive, and difficult to control types of ants comprises the imported fire ant (Order: Hymenoptera, Family: Fomicidae, and Species *Solenopsis richteri* and *Solenopsis invicta*). Researchers believe that the first *Solenopsis richteri* ant arrived from South America at the port of Mobile, Ala. in 1918. Additionally, the first *Solenopsis invicta* ants also arrived at the port of Mobile sometime between 1933 and 1945. In the absence of any program of federal quarantine, prior to 1958 the fire ant population grew unchecked through the Southern United States increasing at a yearly rate of nearly 150,000 hectors per year. After several decades of unchecked growth, even federal quarantine efforts proved futile in controlling the spread of the fire ants. The average rate of expansion of imported fire ants steadily increased to nearly 2,400,703 hector per year, despite vigorous efforts to control their population growth. The infestation spread rapidly in all directions, with movement to the North slowed in recent years, likely due to climactic limitations. In more recent times, fire ants have been introduced to Puerto Rico and have expanded Westward into Western and Central portions of Texas. Presently, fire ants are found in over 280,000,000 acres in all or part of 670 counties or parishes, in II southern states plus Puerto Rico.

Fire ants indiscriminately build mounds in areas like play grounds, parks, school yards, open fields, roadways, and lawns, with concentrations of up to 400 mounds per square acre. The mounds can range up to several feet in diameter, and can extend up to six feet below ground. Additionally, the mounds can contain horizontal tunnels that can extend 75 to 130 feet in length. Obviously, with such an extensive network of mounds and tunnels the ants quickly overwhelm the area of infestation.

The fire ant has proven to be a nearly indestructible insect responsible for hundreds of millions of human stings each year. The sting frequently causes a painful long lasting irritation, and due both to the high concentration of the number of ants per mound and the number of mounds per area of infestation, multiple stings are the rule rather than the exception. Fire ants have been responsible for the death of not only livestock, but also in some cases humans—in particular young children and the elderly. Consequently, a tremendous amount of effort has been concentrated into the removal and eradication of fire ants.

Many of the methods of eradication focus on the use of pesticides and chemicals to control the ant population. These methods suffer from the drawback of introducing dangerous and poisonous substances into the ground where they pose a risk to the water table, wild life, livestock, and to the human population who may come into contact with the substances. The danger of toxins is compounded by the fact that elimination of a fire ant mound requires complete saturation of the area of the mound including saturation well below ground to reach the entire colony, and in particular the queen. Therefore, topical applications of toxins, or less than complete saturation of the ant mound, merely results in a minor dislocation of the population. Frequently, attempts to eliminate ants from one area simply leads to the spread of the colony to adjacent areas through the creation of new mounds.

Additionally, many species of ants actually provide beneficial effects. In some cases, individuals develop or cultivate ant populations for commercial purposes. In these situations, individuals often need to transport or remove ants from one colony to another, or to remote locations, without damaging or destroying the ants.

Accordingly, a need exists to remove ants and their larvae in an effective and environmentally nondestructive manner, that does not require killing the ants or ant larvae.

SUMMARY OF THE INVENTION

An object of the present invention comprises providing a method for the removal of ants and ant larvae from an ant mound.

Another object of the present invention comprises providing an apparatus for the removal of ants and ant larvae from the ant mound. These and other objects of the present invention will become apparent to those skilled in the art upon reference to the following specification, drawings, and claims.

The present invention intends to overcome the difficulties encountered heretofore to that end, a liquid bearing member is inserted into an ant mound thereby allowing the inundation of the ant mound with a liquid. An evacuation chamber secures over the ant mound, thereby allowing the capture of the liquid within the evacuation chamber. Upon inundating the ant mound with the liquid, the liquid level rises in the evacuation chamber to a level elevated above the surface of the ant mound. The ants and ant larvae, in accordance with their survival instincts, rise to the top level of the liquid within the evacuation chamber thereby entering a collection device in operable communication with the evacuation chamber.

DETAILED DESCRIPTION OF THE INVENTION

Figure 1:
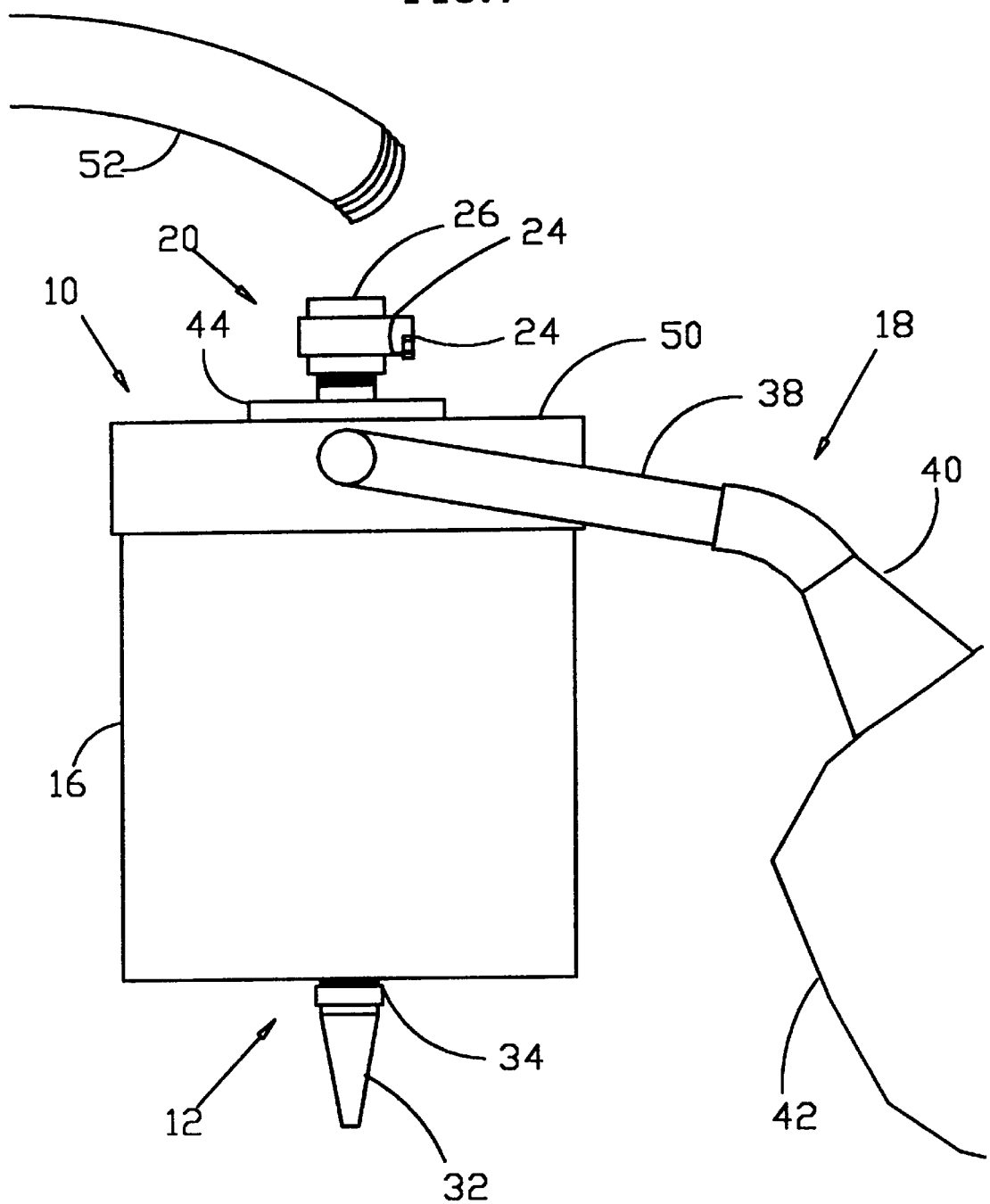
FIG. 1 is a side elevation view of an apparatus for removal of ants and ant larvae.

In the drawings, FIG. 1 shows an apparatus 10 for removal of ants and ant larvae from an ant mound. The apparatus 10 comprises a liquid bearing member 12, an evacuation chamber 16, a collection device 18, and a valve 20. In particular, the valve 20 contains a threaded opening 58 for receipt of a liquid source 52. In the preferred embodiment of the invention the liquid source 52 comprises a common water hose, however, those of ordinary skill in the art will appreciate that the present invention accommodates a wide variety and configuration of liquid sources. The liquid source 52 threadably secures to the threaded opening 58 of the valve 20. Additionally, the apparatus 10 also comprises a chamber top 50, and an evacuation chamber aperture block 44.

Figure 4:
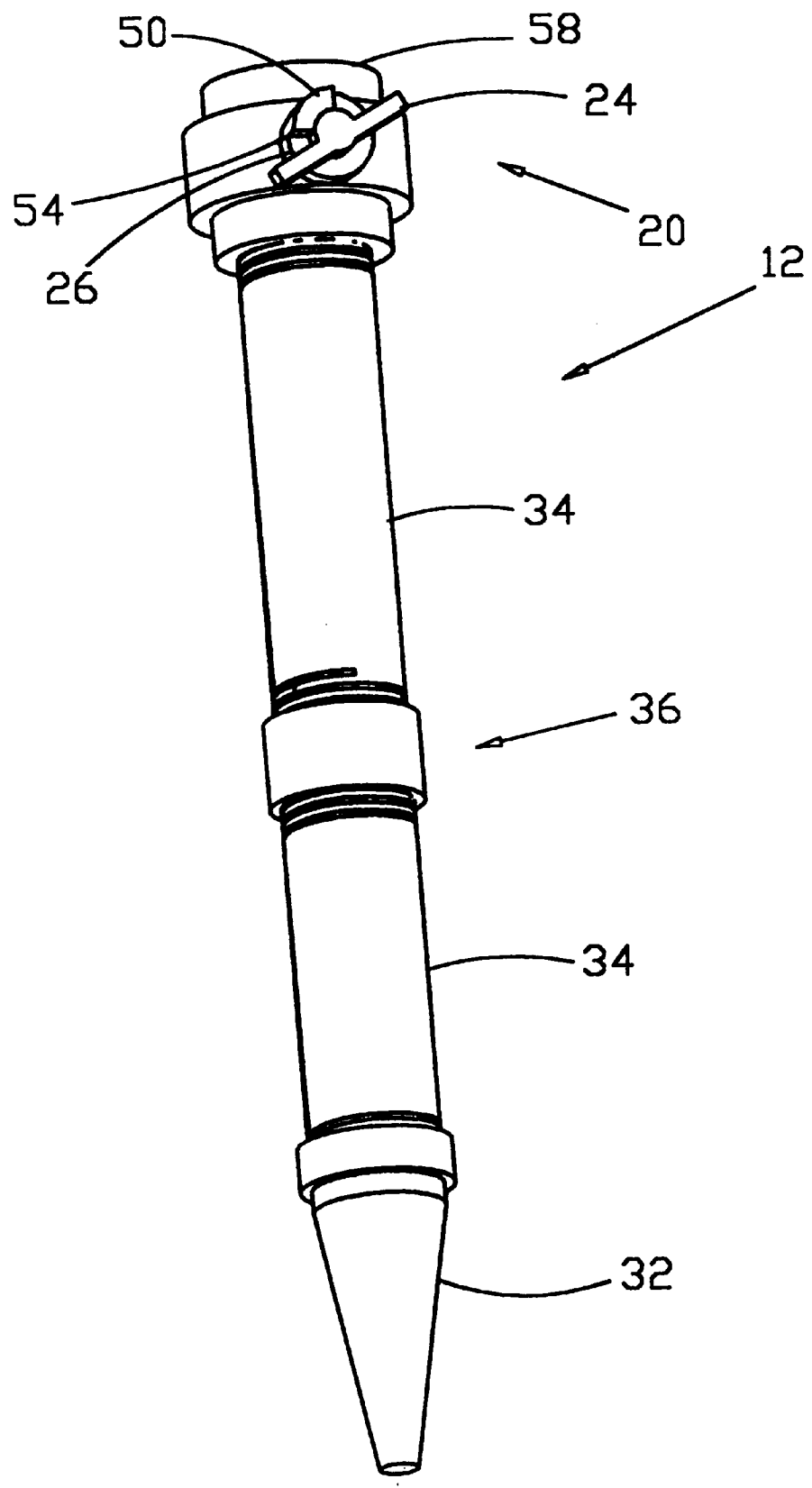
FIG. 4 is a side elevation view of a liquid bearing member of the apparatus of FIG. 1.

In greater detail, FIG. 4 shows an enhanced view of the liquid bearing member 12 and valve 20. The liquid bearing member 12 comprises a nozzle 32, preferably threadable, for removable engagement with a liquid bearing member housing 34. The liquid bearing member housing 34 further engages with a threaded joint 36 to provide for adjusting the length of the liquid bearing member housing 34. Finally, the liquid bearing member housing 34 threadably secures to the valve 20.

Figure 2:
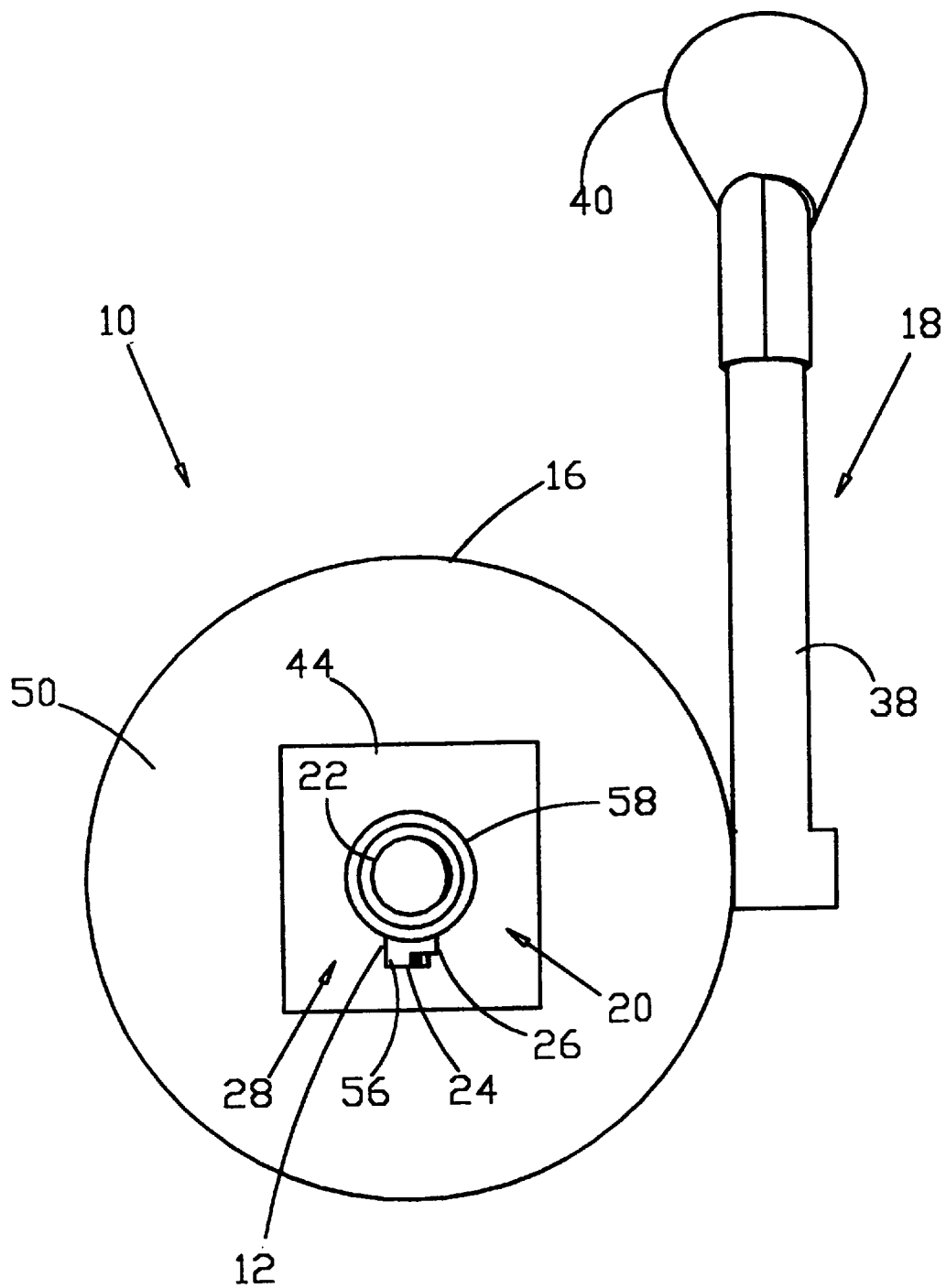
FIG. 2 is a top plan view of the apparatus in FIG. 1 with the valve in an open position.
Figure 3:
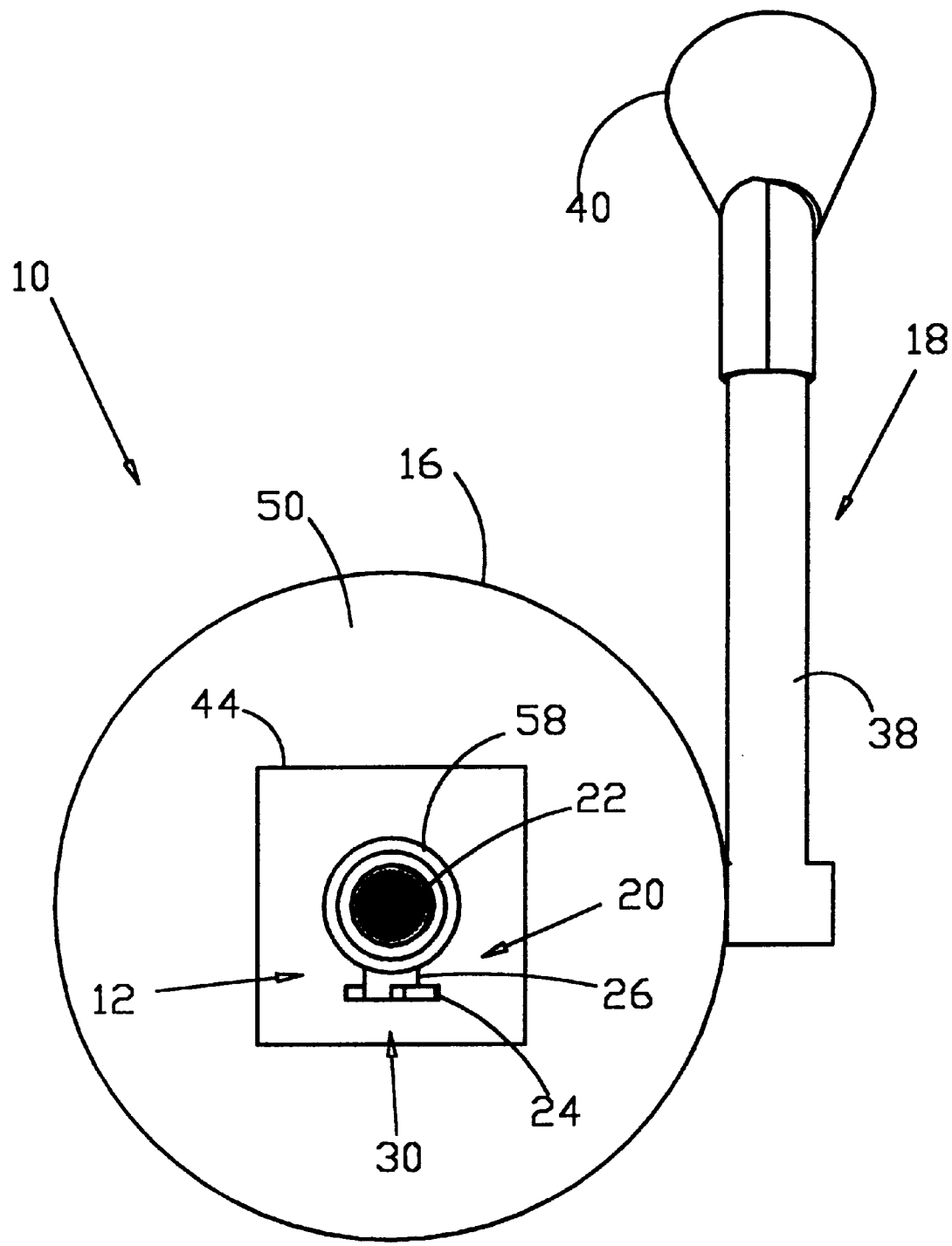
FIG. 3 is a top plan view of the apparatus in FIG. 1 with the valve in a closed position.

The valve 20 comprises a valve handle 24, a valve flange 26, and a valve sleeve 22 (shown in FIG. 3). FIGS. 2–3 show top plan views of the apparatus 10 with different configurations of the valve 20. In particular, FIG. 2 shows the valve 20 in an open position 28. In this position the valve handle 24 rests upon an open stop 56 of the valve flange 26 such that the cylindrical shaped valve sleeve 22 aligns substantially parallel to the liquid bearing member housing 34. Configured in this manner, the valve 20 is in the open position 28 to allow a liquid to flow from the liquid source 52 into the liquid bearing member 12 and out of the nozzle 32. FIG. 3 shows the valve 20 in a closed position 30. In this position the valve handle 24 aligns in a position perpendicular to the position of the valve handle 24 shown in FIG. 2. The valve handle 24 rests against a closed stop 54 of the valve flange 26. Rotated in this position the valve handle 24 rotates the cylindrical shaped valve sleeve 22 into the closed position 30. FIG. 3 shows the valve sleeve 22 sealing off the threaded opening 58. In this manner, the valve 20 allows for opening and closing the threaded opening 58 to facilitate easily stopping and starting the flow of liquid from the liquid source 52.

Figure 5:
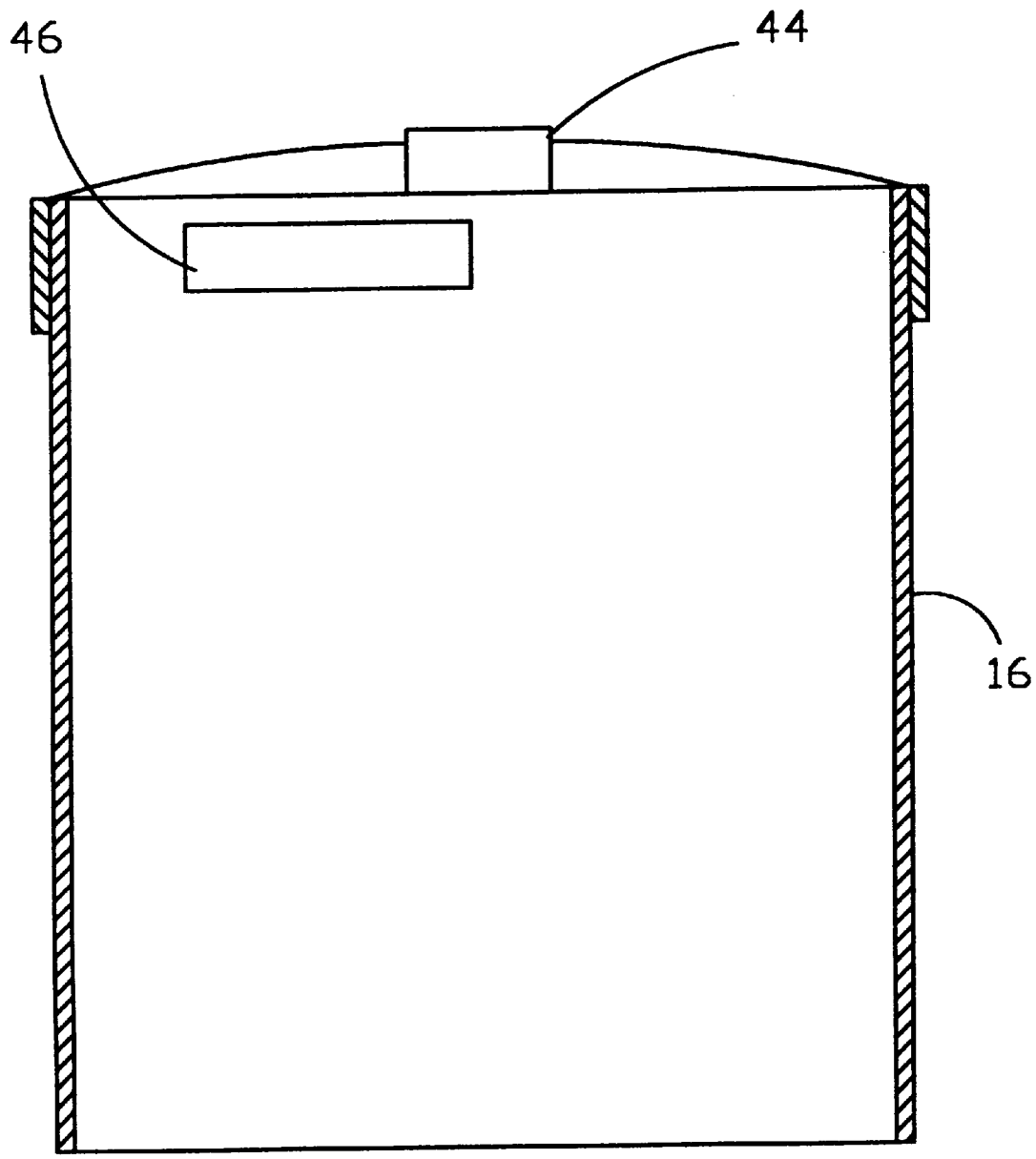
FIG. 5 is a cross sectional view of an evacuation chamber of the apparatus of FIG. 1.

FIG. 5 shows a cross sectional view of the evacuation chamber 16. FIG. 5 shows that the evacuation chamber 16 also comprises an evacuation chamber aperture 46. The evacuation chamber aperture 46 provides a passageway between the evacuation chamber 16 and the collection device 18. Thus, the evacuation chamber aperture 46 provides for operable communication between the evacuation chamber 16 and the collection device 18.

The collection device 18 comprises a collection tube 38 which mounts to the evacuation chamber 16 such that the evacuation chamber aperture 46 provides communication between the evacuation chamber 16 and the collection tube 38 of the collection device 18 (FIG. 1). The collection device 18 also comprises a collection member 40 and a collection webbing 42. In the preferred embodiment of the invention the collection member 40 comprises a portion of a large transparent plastic bottle, and the collection webbing 42 comprises a finely webbed glove which secures over an open end of the collection member 40. Those of ordinary skill in the art will appreciate the fact that the depiction of the collection device 18 and the collection webbing 42 depicted in the drawings is merely illustrative, and these items can be altered and varied in form to accomplish the purpose of the invention without departing from the intended scope of the invention.

The following describes the method used for the removal of ants and ant larvae from the ant mound, which in the preferred embodiment of the invention utilizes the above-identified apparatus. Initially, the method begins by inserting the liquid bearing member 12 of the apparatus 10 into an ant mound. By placing the valve handle 24 of the valve 20 in the open position 28 (as shown in FIG. 2) liquid from the liquid source 52 can enter the liquid bearing member 12, and the liquid then inundates the ant mound through the nozzle 32. Securing the evacuation chamber 16 of the apparatus 10 over the ant mound, and upon inundating the ant mound with the liquid through the liquid bearing member 12, allows for capturing the liquid in the evacuation chamber 16. While continuing to inundate the ant mound, the liquid level rises in the evacuation chamber 16 to an elevated level above the ant mound. Eventually the liquid elevates to a level where it reaches the evacuation chamber aperture 46, thereby allowing the liquid in the evacuation chamber 16 to enter the collection device 18. The liquid enters the collection device 18 through the collection tube 38 and travels to the collection member 40 and eventually drains into the collection webbing 42. The openings in the collection webbing 42 allow the liquid to pass through, but block the flow of ants and ant larvae in the liquid.

The method and apparatus for the removal of ants and ant larvae takes advantage of the fact that ants and their larvae possess a strong survival instinct, whereby the ants and the ant larvae float in water. Observers can see this survival technique when ants cross a stream. The present invention utilizes this natural occurrence to trap and remove the ants and their larvae. The liquid inundates and saturates the ant mound, penetrating to the deepest tunnels of the mound, wherein the ants naturally float to the top of the water. Eventually, the ants rise into the evacuation chamber 16, as the liquid level also rises in the evacuation chamber 16. Then, the liquid begins to drain from the evacuation chamber aperture 46, and then into the collection device 18 taking the ants and larvae with it. The ants and ant larvae are carried by the liquid through the collection tube 38 into the collection member 40 and finally into the collection webbing 42. The liquid passes through the collection webbing 42, while the ants and the ant larvae remain in the collection webbing 42. In this manner, the present invention captures and removes the ants and the ant larvae from the ant mound without the use of toxins or poisons, and allows for free disposal or relocation of the ants and the ant larvae.

Figure 6:
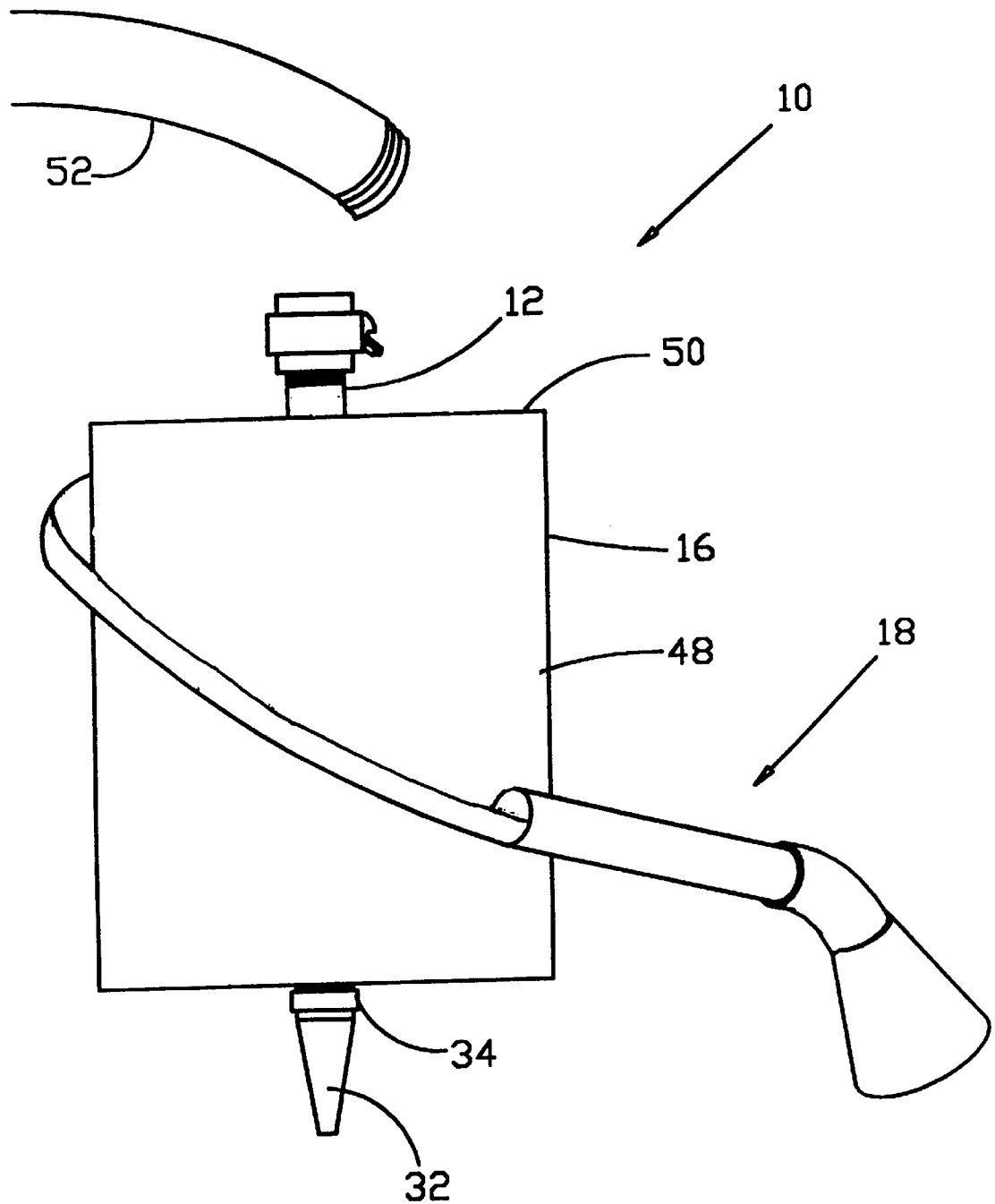
FIG. 6 is a side elevation view of an alternative embodiment of an apparatus for removal of ants and ant larvae.

FIG. 6 shows an alternative apparatus 10', comprised of a liquid bearing member 12', an evacuation chamber 16', and a collection device 18'. The liquid bearing member 34' of the alternative apparatus 10' also comprises a nozzle 32' threaded to a liquid member bearing housing 34' which eventually threadably secures to a liquid source 52'. The alternative apparatus 10' operates in a manner identical to that of apparatus 10 except that alternative apparatus 10' contains an open chamber top 50'. Accordingly, when the liquid level rises within the evacuation chamber 16' it eventually reaches the chamber top 50' and then spills over into the collection device 18'. The collection device 18' comprises a overflow thread 48 which captures the liquid and directs it to the bottom of the overflow thread 48 for permanent collection. In this manner, the ants and ant larvae floating on top of the liquid leave the evacuation chamber 16' through the chamber top 50' and enter the collection device 18'. The ants travel along the overflow thread 48 eventually reaching the end of the overflow thread 48 where the ants and ant larvae can be permanently removed, disposed of, or relocated.

In the preferred embodiment of the present invention the liquid comprises water, and even more preferably water at an ambient temperature. Water comprises a non-toxic, non-poisonous inert substance that will not damage the surrounding environment, and in most cases will provide a beneficial effect to the surrounding plant, animal, and insect population. However, those of ordinary skill in the art will recognize the adaptability of the present invention to liquids other than water. Additionally, maintaining the water or liquid at an ambient temperature, substantially equivalent to the temperature of the surrounding environment, will allow for removal of the ant and ant larvae without harm. This obviates the need for heating or preheating the water or liquid in any manner, and also allows the practice of the invention in those situations where practitioners wish to keep the ants or ant larvae alive, for example, for relocation purposes.

While the present invention is preferably directed toward removal of imported fire ants, those of ordinary skill in the art will appreciate the fact that the present invention applies equally well to other species and variety of ants, as well as to other mounding insects that exhibit similar survival instincts.

The foregoing description and drawings comprise illustrative embodiments of the present inventions. The foregoing embodiments and the methods described herein may vary based on the ability, experience, and preference of those skilled in the art. Merely listing the steps of the method in a certain order does not constitute any limitation on the order of the steps of the method. The foregoing description and drawings merely explain and illustrate the invention, and the invention is not limited thereto, except insofar as the claims are so limited. Those skilled in the art who have the disclosure before them will be able to make modifications and variations therein without departing form the scope of the invention. For example, the liquid bearing member and the evacuation chamber could separately integrate with the ant mound.

I claim:

1. A method for the removal of ants and ant larva from an ant mound, said method comprising:
   a) providing a liquid bearing member;
   b) providing an evacuation chamber;
   c) providing a collection device in operable communication with said evacuation chamber;
   d) inserting said liquid bearing member into the ant mound;
   e) securing said evacuation chamber over the ant mound;
   f) inundating the ant mound with liquid through said liquid bearing member;
   g) capturing said liquid in said evacuation chamber, wherein a level ol said liquid in said evacuation chamber is elevated above the ant mound; and
   h) collecting the ants and ant larva in said collection device by allowing said liquid in said evacuation chamber to enter said collection device.

2. The invention in accordance with claim 1 wherein a substantial portion of said ants and ant larva are evacuated from the ant mound alive.

3. The invention in accordance with claim 1 wherein said liquid is non-toxic and non-poisonous.

4. The invention in accordance with claim 3 wherein said liquid is water.

5. The invention in accordance with claim 4 wherein said water is substantially at an ambient temperature.

6. The invention in accordance with claim 1 wherein said evacuation chamber substantially surrounds said liquid bearing member.

7. The invention in accordance with claim 1 wherein said liquid enters said collection device from an aperture in said evacuation chamber.

8. The invention accordance with claim 1 wherein said liquid enters said collection device by overflowing said evacuation chamber.

9. An apparatus for the removal of ants and ant larva from an ant mound, said apparatus comprising:
   a) an evacuation chamber secured over the ant mound;
   b) a liquid bearing member for inundating the ant mound with a liquid, mounted in said evacuation chamber such that upon said inundation said liquid is captured in said evacuation chamber thereby rising to an elevated level above the ant mound;
   c) wherein said liquid bearing member extends below the bottom of said evacuation chamber; and
   d) a collection device mounted to said evacuation chamber such that the ants and ant larva collect in said collection device as said liquid enters said collection device from said evacuation chamber upon inundating the ant mound.

* * * * *